US007358828B2

(12) United States Patent
Kato

(10) Patent No.: US 7,358,828 B2
(45) Date of Patent: Apr. 15, 2008

(54) ORTHOGONAL MODULATION DEVICE, METHOD, PROGRAM, RECORDING MEDIUM, AND MODULATION DEVICE

(75) Inventor: Takashi Kato, Saitama (JP)

(73) Assignee: Advantest Corporation, Tokyo (JP)

( * ) Notice: Subject to any disclaimer, the term of this patent is extended or adjusted under 35 U.S.C. 154(b) by 218 days.

(21) Appl. No.: 10/549,629

(22) PCT Filed: Mar. 22, 2004

(86) PCT No.: PCT/JP2004/003816

§ 371 (c)(1),
(2), (4) Date: Jan. 5, 2006

(87) PCT Pub. No.: WO2004/086713

PCT Pub. Date: Oct. 7, 2004

(65) Prior Publication Data

US 2006/0133537 A1    Jun. 22, 2006

(30) Foreign Application Priority Data

Mar. 24, 2003  (JP) .............................. 2003-079475

(51) Int. Cl.
*H03C 3/00* (2006.01)
(52) U.S. Cl. .................................... 332/103
(58) Field of Classification Search ......... 332/103–105
See application file for complete search history.

(56) References Cited

U.S. PATENT DOCUMENTS

| 4,736,390 | A | | 4/1988 | Ward et al. |
| 5,351,016 | A | | 9/1994 | Dent |
| 5,784,402 | A | * | 7/1998 | Feher ......................... 375/130 |
| 6,294,952 | B1 | | 9/2001 | Kato |
| 6,570,933 | B1 | | 5/2003 | Mäkinen |
| 6,714,601 | B2 | | 3/2004 | Makinen |
| 2003/0118121 | A1 | | 6/2003 | Makinen |

FOREIGN PATENT DOCUMENTS

DE        10023734        12/2000

(Continued)

OTHER PUBLICATIONS

English Language Abstract of JP 2001-333120.
English Language Abstract of JP 2000-022592.
Finger, "Digitale Signalstrukturen in der Informationstechnik", München, Oldernbourg Verlag, ISBN 3-486-29851-8, pp. 127-132, 1985.

(Continued)

*Primary Examiner*—David Mis
(74) *Attorney, Agent, or Firm*—Greenblum & Bernstein, P.L.C.

(57) ABSTRACT

It is possible to calibrate an I(Q) signal without interrupting the modulation operation of an orthogonal modulation device. The orthogonal modulation device includes: an adder for outputting a pseudo noise superimposed signal obtained by adding the I(Q) signal to a pseudo noise PN; a signal conversion section for mixing the pseudo noise superimposed signal with a local signal of a predetermined local frequency and outputting a converted signal; a phase shifted local signal multiplier for multiplying the local signal whose phase has been changed by a phase shifted device with the converted signal; a pseudo noise multiplier for multiplying the output of the phase shifted local signal multiplier with the pseudo noise; an integrator for integrating the output of the pseudo noise multiplier; and an error measurement section for measuring the error of the I(Q) signal according to the output of the integrator. Since an output of an IF signal output adder can be used as an IF signal, it is possible to perform calibration without interrupting the modulation operation.

33 Claims, 6 Drawing Sheets

FOREIGN PATENT DOCUMENTS

| | | |
|---|---|---|
| JP | 9-504673 | 5/1997 |
| JP | 2000-022592 | 1/2000 |
| JP | 2001-505016 | 4/2001 |
| JP | 2001-333120 | 11/2001 |

OTHER PUBLICATIONS

Goiser, Alois M. J.,"Handbuch der Spread-Spectrum-Technik", Wien, Springer Verlag, ISBM 3-211-83080-4, pp. 114-115, 1998.

* cited by examiner

US 7,358,828 B2

ORTHOGONAL MODULATION DEVICE, METHOD, PROGRAM, RECORDING MEDIUM, AND MODULATION DEVICE

TECHNICAL FIELD

The present invention relates to a calibration of an orthogonal modulator.

BACKGROUND ART

Conventionally, an IF (Intermediate Frequency) signal has been generated by an orthogonal modulation. FIG. 6 shows an orthogonal modulation circuit according to prior art.

With reference to FIG. 6, base band signals include an I signal and a Q signal. The I signal is amplified by an amplifier 102. A multiplier 104 mixes the amplified signal with a local signal generated by a local signal source 300. The Q signal is amplified by an amplifier 202. The phase of the local signal generated by the local signal source 300 is shifted by a phase shifter 304 by 90 degrees. Then, the multiplier 204 mixes the Q signal amplified by the amplifier 202 and the local signal whose phase has been shifted by 90 degrees with each other. An adder 400 adds an output from the multiplier 104 to an output from the multiplier 204, and outputs an added signal as an IF signal.

On this occasion, it is difficult to precisely maintain a phase difference between the local signals supplied respectively to the multiplier 104 and the multiplier 204 to 90 degrees. A phase error is thus generated. Moreover, since the base band signals include two systems: the I signal and Q signal, there may be difference in the amplitude between the I signal and the Q signal. Amplitude errors are thus generated. Therefore, it is necessary to remove these errors, namely to carry out a calibration.

For the calibration, signals used for the calibration are supplied as the I signal and Q signal. The calibration is carried out based upon a signal output from the adder 400 as a result of supplying the calibration signals.

Note that Japanese Laid-Open Patent Publication (Kokai) No. 2001-333120 describes a calibration for a demodulator.

However, during the calibration, an IF signal cannot be generated by means of the orthogonal modulation.

The present invention has an object of providing an orthogonal modulation device and the like which can carry out a calibration without stopping a modulation carried out by the orthogonal modulation device.

DISCLOSURE OF THE INVENTION

According to the present invention, an orthogonal modulation device includes: an adding unit that outputs a pseudo noise superimposed signal obtained by adding a pseudo noise to a user signal; a signal conversion unit that mixes the pseudo noise superimposed signal with a local signal at a predetermined local frequency, and outputs an converted signal; a phase shifting unit that outputs a phase shifted local signal obtained by shifting the phase of the local signal; a phase shifted local signal multiplying unit that multiplies the converted signal by the phase shifted local signal; and a correlating unit that obtains a correlation between an output from the phase shifted local signal multiplying unit and the pseudo noise.

According to the thus constructed orthogonal modulation device, an adding unit outputs a pseudo noise superimposed signal obtained by adding a pseudo noise to a user signal. A signal conversion unit mixes the pseudo noise superimposed signal with a local signal at a predetermined local frequency, and outputs an converted signal. A phase shifting unit outputs a phase shifted local signal obtained by shifting the phase of the local signal. A phase shifted local signal multiplying unit multiplies the converted signal by the phase shifted local signal. A correlating unit obtains a correlation between an output from the phase shifted local signal multiplying unit and the pseudo noise.

According to the present invention, the correlating unit may include a pseudo noise multiplying unit that multiplies the output from the phase shifted local signal multiplying unit by the pseudo noise; and an integrating unit that integrates an output from the pseudo noise multiplying unit, and outputs an integrated signal.

According to the present invention, an integration interval of the integrating unit may be sufficiently longer than the period of the local signal.

According to the present invention, the integration interval of the integrating unit may be sufficiently longer than the period of the pseudo noise; and the period of the pseudo noise may be sufficiently longer than the period of the local signal.

According to the present invention, the orthogonal modulation device may include: an error measurement unit that measures a DC offset error, a phase error, and an amplitude error in the output from the integrating unit.

According to the present invention, the error measurement unit may neglect at least one of the DC offset error, the phase error, and the amplitude error, and may measure errors which are not neglected.

According to the present invention, the pseudo noise may be smaller than the user signal.

According to the present invention, the pseudo noise may be approximately equal to a floor noise.

According to the present invention, the orthogonal modulation device wherein the user signal includes an I signal and a Q signal, may includes a pseudo noise addition subject signal selecting unit that selects whether the pseudo noise is added to the I signal or the Q signal.

According to the present invention, the orthogonal modulation device, includes a first subtracting unit that subtracts the user signal from the output from the phase shifted local signal multiplying unit, the pseudo noise multiplying unit multiplying an output from the first subtracting unit by the pseudo noise.

According to the present invention, the orthogonal modulation device wherein the user signal includes an I signal and a Q signal, may include a pseudo noise addition subject signal selecting unit that selects whether the pseudo noise is added to the I signal or the Q signal; and a subtraction subject signal selecting unit that selects the user signal to which the pseudo noise addition subject signal selecting unit has selected to add the pseudo noise as the user signal to be supplied to the first subtracting unit.

According to the present invention, the orthogonal modulation device, may include a second subtracting unit that subtracts a signal obtained by mixing the user signal and the local signal from the converted signal, the phase shifted local signal multiplying unit multiplying a signal output from the second subtracting unit by the phase shifted local signal.

According to the present invention, the orthogonal modulation device wherein the user signal includes an I signal and a Q signal, may include a pseudo noise addition subject signal selecting unit that selects whether the pseudo noise is added to the I signal or the Q signal; and a subtraction subject signal selecting unit that selects the user signal to which the pseudo noise addition subject signal selecting unit has selected to add the pseudo noise as the user signal to be supplied to the second subtraction unit.

According to the present invention, an orthogonal modulation method includes: an adding step of outputting a pseudo noise superimposed signal obtained by adding a pseudo noise to a user signal; a signal conversion step of mixing the pseudo noise superimposed signal with a local signal at a predetermined local frequency, and outputs an converted signal; a phase shifting step of outputting a phase shifted local signal obtained by shifting the phase of the local signal; a phase shifted local signal multiplying step of multiplying the converted signal by the phase shifted local signal; a correlating step of obtaining a correlation between an output from the phase shifted local signal multiplying step and the pseudo noise; and an error measurement step of measuring an error of the user signal based on an output from the correlating step.

The present invention is a program of instructions for execution by the computer to perform an error measurement process of an orthogonal modulation device having: an adding unit that outputs a pseudo noise superimposed signal obtained by adding a pseudo noise to a user signal; a signal conversion unit that mixes the pseudo noise superimposed signal with a local signal at a predetermined local frequency, and outputs an converted signal; a phase shifting unit that outputs a phase shifted local signal obtained by shifting the phase of the local signal; a phase shifted local signal multiplying unit that multiplies the converted signal by the phase shifted local signal; and a correlating unit that obtains a correlation between an output from the phase shifted local signal multiplying unit and the pseudo noise, the error measurement process including: an error measurement step of measuring an error of the user signal based on an output from the correlating step.

The present invention is a computer-readable medium having a program of instructions for execution by the computer to perform an error measurement process of an orthogonal modulation device having: an adding unit that outputs a pseudo noise superimposed signal obtained by adding a pseudo noise to a user signal; a signal conversion unit that mixes the pseudo noise superimposed signal with a local signal at a predetermined local frequency, and outputs an converted signal; a phase shifting unit that outputs a phase shifted local signal obtained by shifting the phase of the local signal; a phase shifted local signal multiplying unit that multiplies the converted signal by the phase shifted local signal; and a correlating unit that obtains a correlation between an output from the phase shifted local signal multiplying unit and the pseudo noise, the error measurement process including: an error measurement step of measuring an error of the user signal based on an output from the correlating step.

According to the present invention, a modulation device includes: an adding unit that outputs a pseudo noise superimposed signal obtained by adding a pseudo noise to a user signal; and a correlating unit that obtains a correlation between a modulated signal obtained by modulating an output from the adding unit and the pseudo noise.

According to the thus constructed modulation device, an adding unit outputs a pseudo noise superimposed signal obtained by adding a pseudo noise to a user signal. A correlating unit obtains a correlation between a modulated signal obtained by modulating an output from the adding unit and the pseudo noise.

BEST MODE FOR CARRYING OUT THE INVENTION

A description will now be given of embodiments of the present invention with reference to drawings.

First Embodiment

Figure 1:
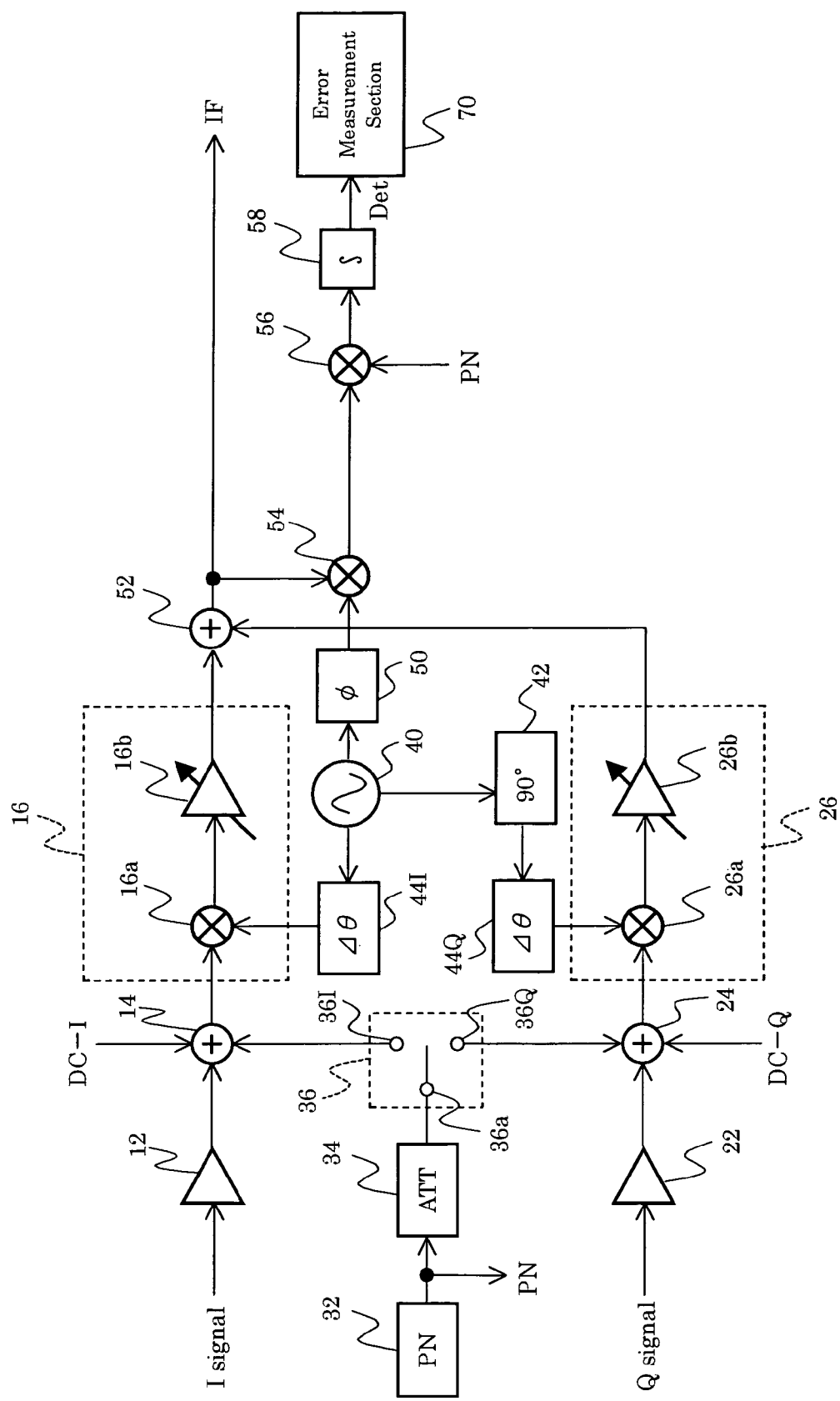
FIG. 1 is a block diagram showing a configuration of an orthogonal modulation device according to a first embodiment of the present invention.

FIG. 1 is a block diagram showing a configuration of an orthogonal modulation device according to a first embodiment of the present invention. The orthogonal modulation device according to the first embodiment is provided with amplifiers 12 and 22, adders 14 and 24, signal conversion sections 16 and 26, a pseudo noise generator 32, an attenuator 34, a pseudo noise addition subject signal selecting section 36, a local signal source 40, a 90-degree phase shifter 42, phase finely adjusting sections 44I and 44Q, a phase shifter 50, an IF signal output adder 52, a phase shifted local signal multiplier 54, a pseudo noise multiplier 56, an integrator 58, and an error measurement section 70.

The amplifier 12 amplifies the I signal. The amplifier 22 amplifies the Q signal. The I signal and the Q signal are user signals.

The pseudo noise generator 32 generates a pseudo noise PN. The pseudo noise PN is, for example, an M-sequence pseudo random pattern, and generates a random pattern with a long period where probabilities of generation of two values are approximately 50%. Namely, if the period is $n=2^m-1$, the high level signal is generated $2^{m-1}$ times, and the low level signal is generated $2^{m-1}-1$ times. However, the pseudo noise PN herein may be such a noise P(t) that an integral of $P(t)^2$ for a sufficiently long interval is a non-zero constant, and an integral of P(t) for a sufficiently long interval is 0. The pseudo noise PN is not necessarily limited to an M-sequence pseudo random pattern. Note that a natural thermal noise may be employed in place of the pseudo noise generator 32.

The attenuator 34 reduces the level of the pseudo noise PN generated by the pseudo noise generator 32 to a level lower than that of the I signal or the Q signal. The level of the pseudo noise PN is preferably reduced to or below a floor noise (−70 dBc, for example).

The pseudo noise addition subject signal selecting section 36 selects whether the pseudo noise PN is added to the I signal or the Q signal. The pseudo noise addition subject signal selecting section 36 serves as a switch. If a terminal 36a and a terminal 36I are connected with each other, the pseudo noise PN is added to the I signal. If a terminal 36a and a terminal 36Q are connected with each other, the pseudo noise PN is added to the Q signal.

The adder 14 adds a DC offset (DC-I) and the pseudo noise PN to the I signal amplified by the amplifier 12. Note that the pseudo noise PN is added if the pseudo noise addition subject signal selecting section 36 selects to add the pseudo noise PN to the I signal. The DC offset (DC-I) is a signal used to adjust an offset error of the I signal.

The adder 24 adds a DC offset (DC-Q) and the pseudo noise PN to the Q signal amplified by the amplifier 22. Note that the pseudo noise PN is added if the pseudo noise addition subject signal selecting section 36 selects to add the pseudo noise PN to the Q signal. The DC offset (DC-Q) is a signal used to adjust an offset error of the Q signal.

A signal obtained by adding the pseudo noise PN to the I signal (Q signal) is referred to as a pseudo noise superimposed signal.

The local signal source 40 generates a local signal at a predetermined local frequency. The 90-degree phase shifter 42 shifts the phase of the local signal by 90 degrees. The phase finely adjusting section 44I finely adjusts the phase of the local signal. The phase finely adjusting section 44Q finely adjusts the phase of an output from the 90-degree phase shifter 42. The phase finely adjusting sections 44I and 44Q finely adjust the phases so that the phase difference between signals respectively output therefrom is exactly 90°. Namely, a phase errors between the I signal and the Q signal is adjusted.

The signal conversion section 16 includes a multiplier 16a and a variable gain amplifier 16b. The multiplier 16a mixes the local signal output from the phase finely adjusting section 44I and an output from the adder 14 by multiplying them by each other. If the pseudo noise signal is added to the I signal by the adder 14, the pseudo noise superimposed signal is to be mixed with the local signal. The variable gain amplifier 16b amplifies an output from the multiplier 16a, and outputs an amplified signal. The variable gain amplifier 16b adjusts an amplitude error of the I signal by changing a gain thereof. Note that the variable gain amplifier 16b may be provided prior to the multiplier 16a. The signal conversion section 16 outputs a converted signal obtained by mixing the pseudo noise superimposed signal with the local signal, or a signal obtained by mixing the I signal with the local signal in this way.

The signal conversion section 26 includes a multiplier 26a and a variable gain amplifier 26b. The multiplier 26a mixes the local signal output from the phase finely adjusting section 44Q and an output from the adder 24 by multiplying them by each other. If the pseudo noise signal is added to the Q signal by the adder 24, the pseudo noise superimposed signal is to be mixed with the local signal. The variable gain amplifier 26b amplifies an output from the multiplier 26a, and outputs an amplified signal. The variable gain amplifier 26b adjusts an amplitude error of the Q signal by changing a gain thereof Note that the variable gain amplifier 26b may be provided prior to the multiplier 26a. The signal conversion section 26 outputs a converted signal obtained by mixing the pseudo noise superimposed signal with the local signal, or a signal obtained by mixing the Q signal with the local signal in this way.

The phase shifter 50 changes the phase of the local signal from 0 to 360°, and outputs a shifted signal. For example, the phase is changed from 0° to 360° by each 45°.

The IF signal output adder 52 adds an output from the signal conversion section 16 and an output from the signal conversion section 26, and outputs a result of the addition. An output from the IF signal output adder 52 is obtained by adding the converted signal (signal obtained by mixing the pseudo noise superimposed signal obtained by adding the pseudo noise signal to the I signal (Q signal) with the local signal) to the signal obtained by mixing the Q signal (I signal) with the local signal. Since the level of the pseudo noise PN is low, the output from the IF signal output adder 52 can be used as an IF signal. Moreover, based upon the IF signal, the DC offset errors, the phase error, and the amplitude errors can be obtained. Consequently, while the IF signal is being obtained, namely the modulation is being carried out, the DC offset error and the like may be obtained, and further, the I signal and Q signal may be calibrated.

The phase shifted local signal multiplier 54 multiplies the output from the phase shifter 50 by the IF signal. Since the IF signal includes the converted signal, it follows that the output from the phase shifter 50 is multiplied by the converted signal.

The pseudo noise multiplier 56 multiplies an output from the phase shifted local signal multiplier 54 by the pseudo noise PN.

The integrator 58 integrates an output from the pseudo noise multiplier 56, and outputs an integrated signal. Note that the integration interval is sufficiently longer than the period of the local signal and the period of the pseudo noise PN. Note that the period of the pseudo noise is sufficiently longer than the period of the local signal. An output from the integrator 58 is denoted by Det. Note that a correlation between the output from the phase shifted local signal multiplier 54 and the pseudo noise PN is obtained by the pseudo noise multiplier 56 and the integrator 58.

The error measurement section 70 calculates the DC offset errors, the phase error, and the amplitude errors based upon Det. Note that at least one of the DC offset errors, the phase error, and the amplitude errors (such as the DC offset errors) may be neglected, and errors which are not neglected may be measured. Note that, based upon the measured results, there are determined the DC offsets (DC-I and DC-Q) supplied to the adders 14 and 24, the amounts of the phases to be adjusted by the phase finely adjusting sections 44I and 44Q, and the gains of the variable gain amplifier 16b and 26b. As a result, there are adjusted the DC offset errors, the phase error, and the amplitude errors.

A description will now be given of an operation of the first embodiment.

The pseudo noise generator 32 generates the pseudo noise PN. The level of the pseudo noise PN is reduced to a level equal to or lower than the floor noise by the attenuator 34. The pseudo noise PN is input to the adder 14 or the adder 24 by the pseudo noise addition subject signal selecting section 36.

The I signal (Q signal) is amplified by the amplifier 12 (22), and is supplied to the adder 14 (24). The pseudo noise PN is supplied to the adder 14 (or the adder 24).

If the pseudo noise PN is supplied to the adder 14, the pseudo noise PN is added to the I signal amplified by the amplifier 12, resulting in the pseudo noise superimposed signal. The DC offset (DC-I) is further added by the adder 14 to adjust the offset error of the I signal. The DC offset (DC-Q) is added to the Q signal amplified by the amplifier 22 to adjust the offset error of the Q signal.

If the pseudo noise PN is supplied to the adder 24, the pseudo noise PN is added to the Q signal amplified by the amplifier 22, resulting in the pseudo noise superimposed signal. The DC offset (DC-Q) is further added by the adder 24 to adjust the offset error of the Q signal. The DC offset (DC-I) is added to the I signal amplified by the amplifier 12 to adjust the offset error of the I signal.

The local signal source 40 generates the local signal at the predetermined local frequency. The local signal is supplied to the signal conversion section 16 via the phase finely adjusting section 44I. Moreover, the local signal is supplied to the signal conversion section 26 via the 90-degree phase shifter 42 and the phase finely adjusting section 44Q.

If the pseudo noise PN is supplied to the adder 14, the multiplier 16*a* mixes the pseudo noise super imposed signal output from the adder 14 with the local signal. If the I signal, the pseudo noise PN, and the local signal are respectively denoted by I(t), P(t), and cos ωt, the output from the multiplier 16*a* is represented as:

$$(I(t)+P(t))\cos \omega t \quad (1)$$

The output from the multiplier 16a is amplified by the variable gain amplifier 16*b*. As a result, the amplitude error of the I signal is adjusted.

The multiplier 26*a* mixes the signal output from the adder 24 with the local signal (note that the phase is shifted by 90°). If the Q signal and the local signal are respectively denoted by Q(t) and cos ωt, the output from the multiplier 26*a* is represented as:

$$Q(t)\sin \omega t \quad (2)$$

The output from the multiplier 26*a* is amplified by the variable gain amplifier 26*b*. As a result, the amplitude error of the Q signal is adjusted.

The outputs from the signal conversion section 16 and the signal conversion section 26 are added by the IF signal output adder 52 to generate the IF signal. Consequently, the IF signal is obtained and is modulated. Since the level of the pseudo noise PN is low, there is caused no problem if the IF signal is used as a modulated signal.

Moreover, the local signal generated by the local signal source 40 is supplied to the phase shifted local signal multiplier 54 via the phase shifter 50.

The IF signal and the output from the phase shifter 50 are multiplied by the phase shifted local signal multiplier 54. If the output from the phase shifter 50 is represented as cos(ωt+φ) (note that φ=an amount of the phase shifted by the phase shifter 50), the output from the phase shifted local signal multiplier 54 is represented as:

$$((I(t)+P(t))\cos \omega t+Q(t)\sin \omega t)\cos(\omega t+\phi) \quad (3)$$

The pseudo noise multiplier 56 multiplies the output from the phase shifted local signal multiplier 54 by the pseudo noise PN. If φ=0, the output from the pseudo noise multiplier 56 is represented as:

$$P(t)((I(t)+P(t))\cos \omega t+Q(t)\sin \omega t)\cos \omega t \quad (5)$$

The integrator 58 integrates the output from the pseudo noise multiplier 56, and outputs the integrated signal. Note that the integration interval is sufficiently longer than the period of the local signal and the period of the pseudo noise. Note that the period of the pseudo noise is sufficiently longer than the period of the local signal. If φ=0, the output from the integrator 58 is represented as:

$$\int P(t)((I(t)+P(t))\cos\omega t + Q(t)\sin\omega t)\cos\omega t = \quad (6)$$
$$\int P(t)I(t)\cos^2\omega t + \int P(t)^2\cos^2\omega t + (1/2)\int P(t)Q(t)\sin 2\omega t =$$
$$\int P(t)^2\cos^2\omega t = c$$

where c is a certain constant. An integral of P(t) in a sufficiently long interval is 0, and terms of P(t) will disappear. An integral of sin 2ωt in a sufficiently long interval is also 0, and a term of sin 2ωt will disappear. An integral of P(t)² in a sufficiently long interval is a constant, which is not 0, and c will thus be the certain constant.

The output from the integrator 58 is denoted by Det, and is supplied to the error measurement section 70.

The above description is given of the case where the pseudo noise PN is supplied to the adder 14. However, the pseudo noise PN may be supplied to the adder 24. In this case, the output from the multiplier 16*a* is represented as:

$$I(t)\cos \omega t \quad (11)$$

The output from the multiplier 26*a* is represented as:

$$(Q(t)+P(t))\sin \omega t \quad (12)$$

The output from the phase shifted local signal multiplier 54 is represented as:

$$(I(t)\cos \omega t+(Q(t)+P(t))\sin \omega t)\cos(\omega t+\phi) \quad (13)$$

If the φ=0, the output from the pseudo noise multiplier 56 is represented as:

$$P(t)(I(t)\cos \omega t+(Q(t)+P(t))\sin \omega t)\cos \omega t \quad (15)$$

The output (Det) from the integrator 58 is represented as:

$$\int P(t)(I(t)\cos\omega t + (Q(t) + P(t))\sin\omega t)\cos\omega t = \int P(t)I(t)\cos^2\omega t + \quad (16)$$
$$(1/2)\int P(t)Q(t)\sin 2\omega t + (1/2)\int P(t)^2\sin 2\omega t = 0$$

Note that the integral of P(t) in a sufficiently long interval is 0, and terms of P(t) will disappear. An integral of sin 2ωt in a sufficiently long interval is also 0, and a term of sin 2ωt will disappear.

Thus, if φ=0,

Det=c, if the pseudo noise PN is supplied to the adder 14 (I signal), and Det=0, if the pseudo noise PN is supplied to the adder 24 (Q signal).

Figure 2:
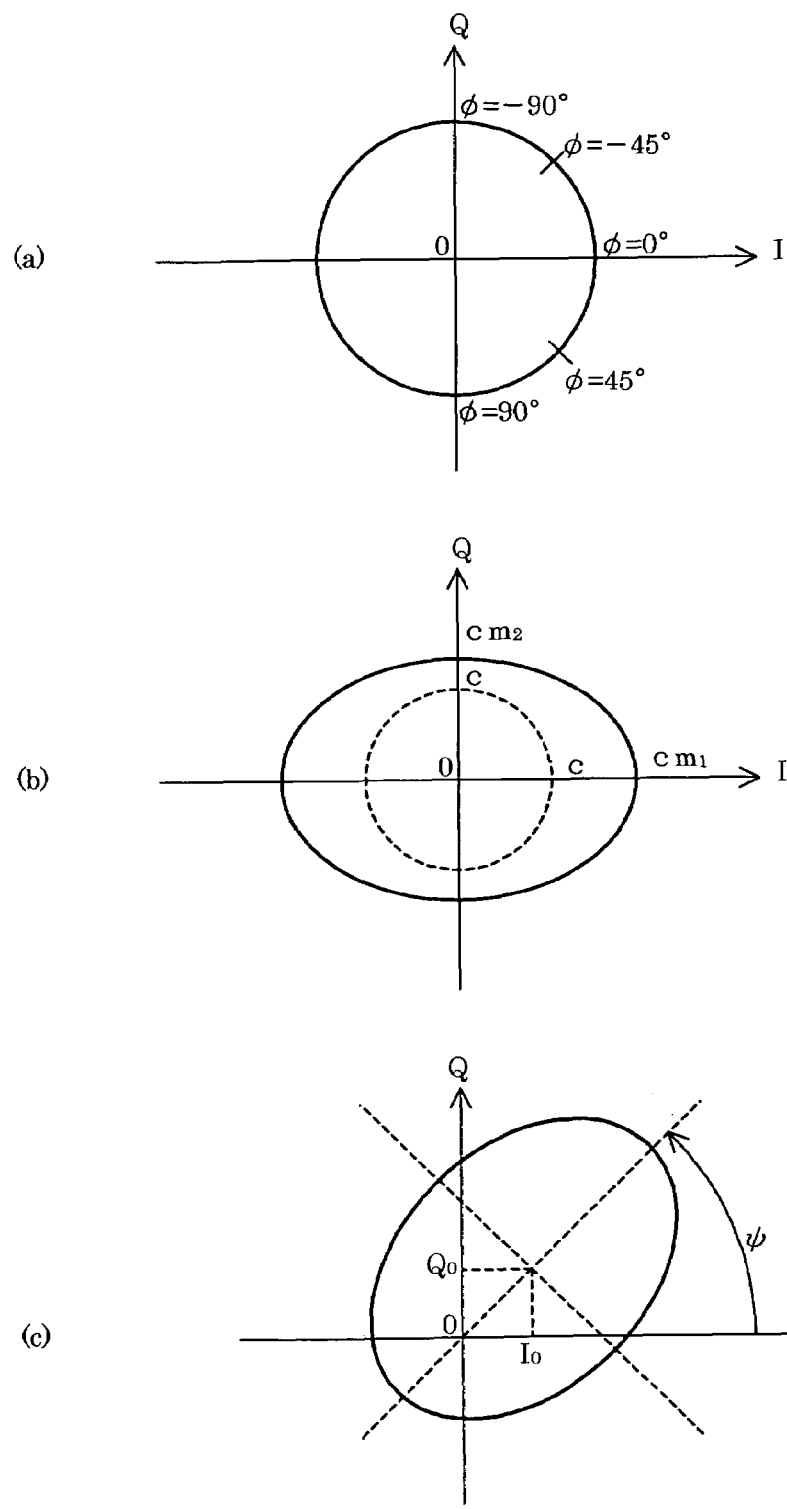
FIG. 2 is a chart showing an output (Det) of an integrator 58 where I is assigned to the horizontal axis, and Q is assigned to the vertical axis, and showing a case without errors (FIG. 2(a)), a case with amplitude errors (FIG. 2(b)), and a case with DC offset errors and a phase error (FIG. 2(c))

Det as described above is shown in FIG. 2(*a*) while I and Q are respectively assigned to the horizontal and vertical axes. If φ=0, (I,Q)=(c, 0). If φ=90°, (I,Q)=(0,−c); if φ=−90,°(I,Q)=(0,c); if φ=45°, (I,Q)=(c/√2, −c/√2); and if φ=−45°, (I,Q)=(c/√2, c/√2). Consequently, Det forms a circle with a radius of c as shown in FIG. 2(*a*).

However, the above result is obtained only if the DC offset errors, the phase error, and the amplitude errors are not present. These errors actually exist.

For example, it is assumed that there are amplitude errors, and the I signal and Q signal are increased respectively by m1 and m2 times, as a result. In this case, as shown in FIG. 2(*b*), the radii with respect to the I and Q axes are increased respectively by m1 and m2 times.

Moreover, it is assumed that there are DC offset errors $I_0$ and $Q_0$ respectively for the I and Q signals, and there is a phase error Ψ. As a result, as FIG. 2(*c*) shows, the coordinate of the center of an ellipsoid is moved to ($I_0$, $Q_0$), and the axes are rotated by Ψ.

The error measurement section 70 receives Det, and represents it on the IQ coordinate system as shown in FIG. 2 to measure the offset errors, phase error, and amplitude errors.

Figure 3:
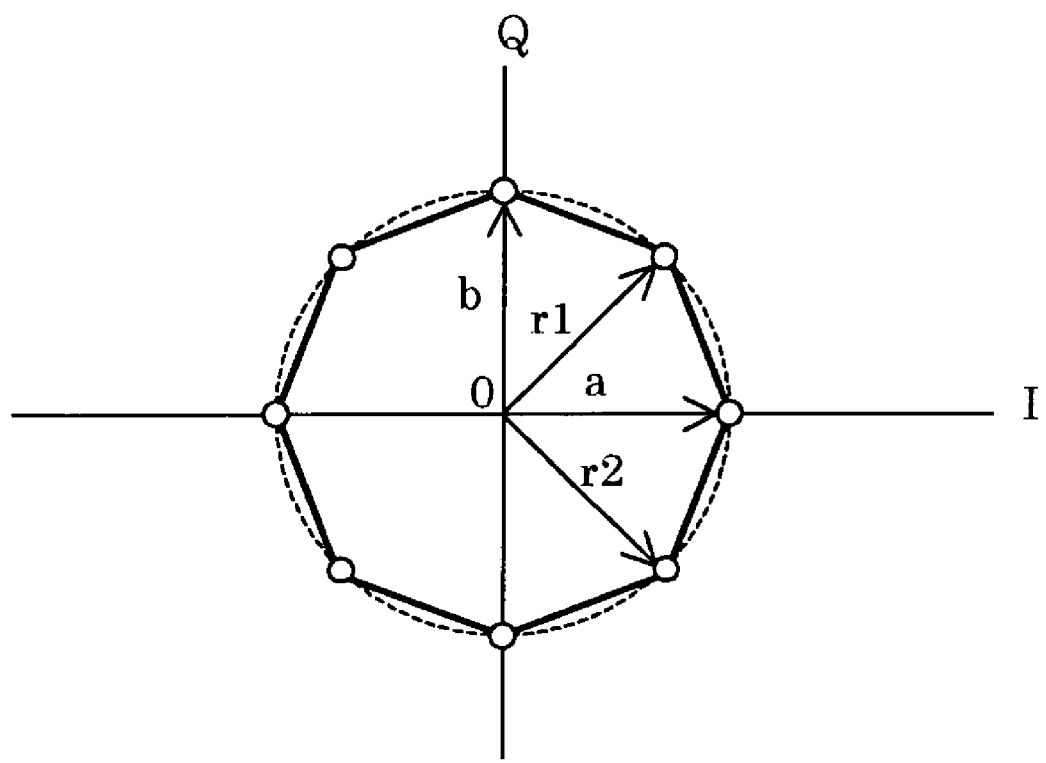
FIG. 3 is a chart showing coordinates of the output (Det) of the integrator 58 while an amount φ of the phase shifted by a phase shifter 50 from 0° to 360° by each 45°.

If φ is changed from 0° to 360° by each 45°, coordinates are obtained at eight points as shown in FIG. 3. In this case, the errors are measured by obtaining the major axis, minor axis, center, and gradient of the axes of the ellipsoid based upon these eight points. On this occasion, if a, b, r1, and r2 are designated as shown in FIG. 3, the phase error Φ is represented as:

$$\Phi = \cos^{-1}(2r1r2/(r1^2+r2^2)) \quad (20)$$

If a reference radius is designated as R, the amplitude error of I signal is represented as:

$$(a-R\cos\Phi)/R\cos\Phi \quad (21)$$

If the reference radius is designated as R, the amplitude error of Q signal is represented as:

$$(b-R\cos\Phi)/R\cos\Phi \quad (22)$$

According to the first embodiment, the IF signal output adder 52 provides the signal obtained by adding the converted signal (the signal obtained by mixing the pseudo noise superimposed signal obtained by adding the pseudo noise signal to the I signal (Q signal) with the local signal) to the signal obtained by mixing the Q signal (I signal) with the local signal. The level of the pseudo noise PN is low on this signal, and this signal may thus be treated as the IF signal.

Moreover, the error measurement section 70 can use the result of the addition by the IF signal output adder 52 to measure the DC offset errors, phase error, and amplitude errors. Therefore, these errors can be calibrated.

Consequently, while the IF signal is obtained, namely the modulation is being carried out, the DC offset errors and the like may be obtained, and further, the I signal and Q signal may be calibrated.

Second Embodiment

A second embodiment is different from the first embodiment in that the I signal or Q signal is subtracted by a first subtractor 60 from the output from the phase shifted local signal multiplier 54, and a result of the subtraction is input to the pseudo noise multiplier 56.

Figure 4:
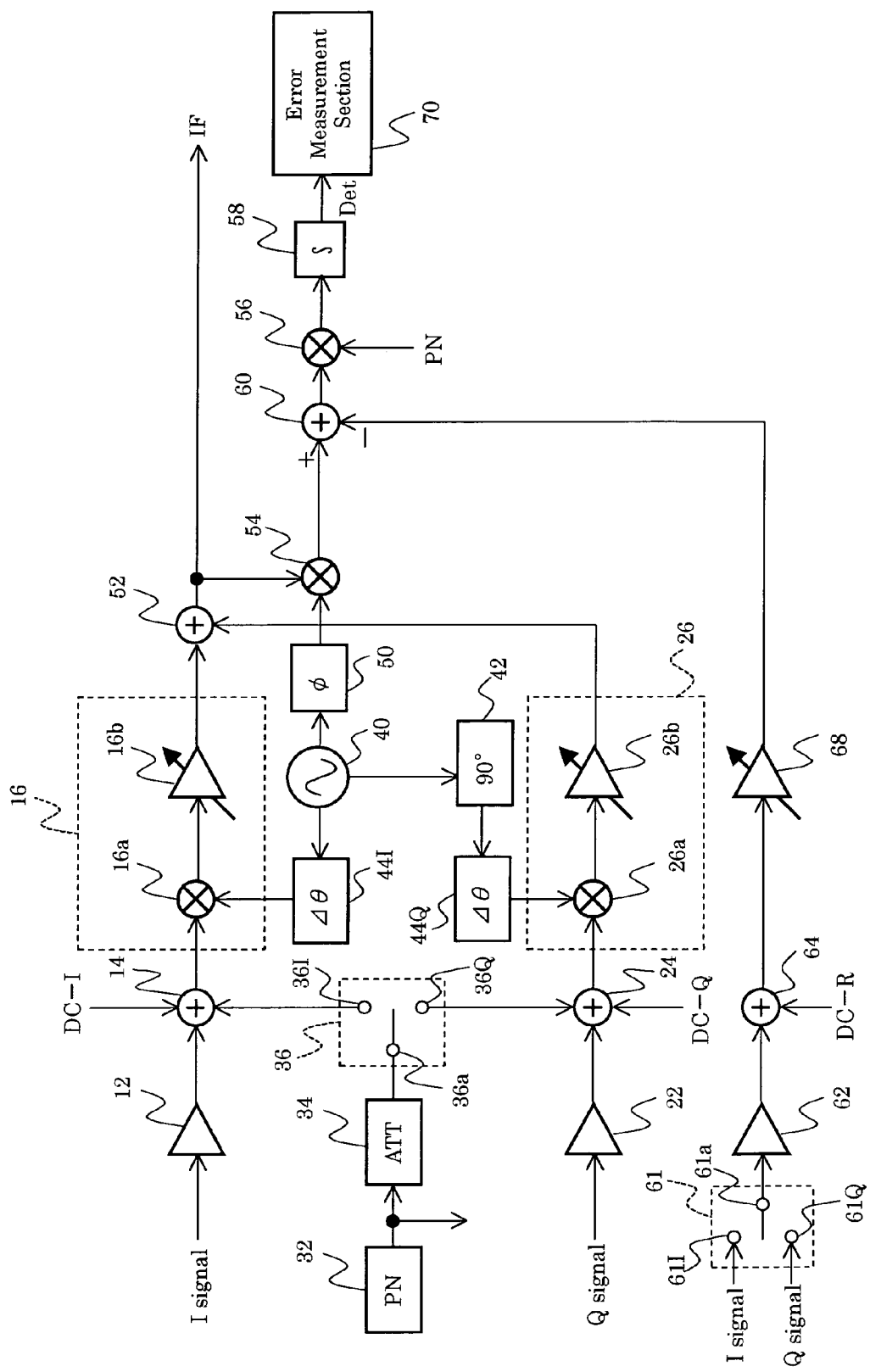
FIG. 4 is a block diagram showing a configuration of an orthogonal modulation device according to a second embodiment of the present invention.

FIG. 4 is a block diagram showing a configuration of an orthogonal modulation device according to the second embodiment of the present invention. The orthogonal modulation device according to the second embodiment is provided with the amplifiers 12 and 22, the adders 14 and 24, the signal conversion sections 16 and 26, the pseudo noise generator 32, the attenuator 34, the pseudo noise addition subject signal selecting section 36, the local signal source 40, the 90-degree phase shifter 42, the phase finely adjusting sections 44I and 44Q, the phase shifter 50, the IF signal output adder 52, the phase shifted local signal multiplier 54, the pseudo noise multiplier 56, the integrator 58, the first subtractor 60, a subtraction subject signal selecting section 61, an amplifier 62, an adder 64, a variable gain amplifier 68, and the error measurement section 70. In the following section, similar components are denoted by the same numerals as of the first embodiment, and will be explained in no more details.

The amplifiers 12 and 22, the adders 14 and 24, the signal conversion sections 16 and 26, the pseudo noise generator 32, the attenuator 34, the pseudo noise addition subject signal selecting section 36, the local signal source 40, the 90-degree phase shifter 42, the phase finely adjusting sections 44I and 44Q, the phase shifter 50, the IF signal output adder 52, the phase shifted local signal multiplier 54, the pseudo noise multiplier 56, the integrator 58, and the error measurement section 70 are the same as those in the first embodiment. Note that the pseudo noise multiplier 56 multiplies the output from the first subtractor 60 by the pseudo noise PN.

The first subtractor 60 subtracts the I signal or the Q signal from the output from the phase shifted local signal multiplier 54. Note that the I signal or Q signal is supplied to the first subtractor 60 via the subtraction subject signal selecting section 61, the amplifier 62, the adder 64, and the variable gain amplifier 68.

The subtraction subject signal selecting section 61 selects the I signal or the Q signal as the user signal supplied to the first subtractor 60. Note that the user signal supplied to the first subtractor 60 is the user signal to which the pseudo noise addition subject signal selecting section 36 has selected to add the pseudo noise. For example, if the pseudo noise PN is added to the I signal (Q signal), the subtraction subject signal selecting section 61 selects the I signal (Q signal) as the user signal to be supplied to the first subtractor 60. The subtraction subject signal selecting section 61 serves as a switch. If a terminal 61a and a terminal 61I are connected with each other, the I signal is supplied to the first subtractor 60. If the terminal 61a and a terminal 61Q are connected with each other, the Q signal is supplied to the first subtractor 60.

The amplifier 62 receives the I signal or Q signal from the subtraction subject signal selecting section 61, and amplifies the received signal.

The adder 64 adds a DC offset (DC-R) to an output from the amplifier 62. Note that the DC offset (DC-R) is a signal used to adjust an offset error of the I signal or the Q signal. Note that "R" of DC-R denotes a capital letter of "Reference". The user signal supplied to the first subtractor 60 is considered as a "Reference".

The variable gain amplifier 68 amplifies an output from the adder 64, and outputs an amplified signal. The variable gain amplifier 68 adjusts an amplitude error of the I signal or the Q signal by changing a gain thereof.

A description will now be given of an operation of the second embodiment.

The pseudo noise generator 32 generates the pseudo noise PN. The level of the pseudo noise PN is reduced to the level equal to or lower than the floor noise by the attenuator 34. The pseudo noise PN is input to the adder 14 or the adder 24 by the pseudo noise addition subject signal selecting section 36.

The I signal (Q signal) is amplified by the amplifier 12 (22), and is supplied to the adder 14 (24). The pseudo noise PN is supplied to the adder 14 (or the adder 24).

If the pseudo noise PN is supplied to the adder 14, the pseudo noise PN is added to the I signal amplified by the amplifier 12, resulting in the pseudo noise superimposed signal. The DC offset (DC-I) is further added by the adder 14 to adjust the offset error of the I signal. The DC offset (DC-Q) is added to the Q signal amplified by the amplifier 22 to adjust the offset error of the Q signal.

If the pseudo noise PN is supplied to the adder 24, the pseudo noise PN is added to the Q signal amplified by the amplifier 22, resulting in the pseudo noise superimposed signal. The DC offset (DC-Q) is further added by the adder 24 to adjust the offset error of the Q signal. The DC offset (DC-I) is added to the I signal amplified by the amplifier 12 to adjust the offset error of the I signal.

The local signal source 40 generates the local signal at the predetermined local frequency. The local signal is supplied to the signal conversion section 16 via the phase finely adjusting section 44I. Moreover, the local signal is supplied to the signal conversion section 26 via the 90-degree phase shifter 42 and the phase finely adjusting section 44Q.

If the pseudo noise PN is supplied to the adder 14, the multiplier 16a mixes the pseudo noise superimposed signal output from the adder 14 with the local signal. If the I signal, the pseudo noise PN, and the local signal are respectively denoted by I(t), P(t), and cos ωt, the output from the multiplier 16a is represented as:

$$(I(t)+P(t))\cos \omega t \quad (31)$$

The output from the multiplier 16a is amplified by the variable gain amplifier 16b. As a result, the amplitude error of the I signal is adjusted.

The multiplier 26a mixes the signal output from the adder 24 with the local signal (note that the phase is shifted by 90°). If the Q signal and the local signal are respectively denoted by Q(t) and cos ωt, the output from the multiplier 26a is represented as:

$$Q(t)\sin \omega t \quad (32)$$

The output from the multiplier 26a is amplified by the variable gain amplifier 26b. As a result, the amplitude error of the Q signal is adjusted.

The outputs from the signal conversion section 16 and the signal conversion section 26 are added by the IF signal output adder 52 to generate the IF signal. Consequently, the IF signal is obtained and is modulated. Since the level of the pseudo noise PN is low, there is caused no problem if the IF signal is used as a modulated signal.

Moreover, the local signal generated by the local signal source 40 is supplied to the phase shifted local signal multiplier 54 via the phase shifter 50.

The IF signal and the output from the phase shifter 50 are multiplied by the phase shifted local signal multiplier 54. If the output from the phase shifter 50 is represented as cos(ωt+φ) (note that φ=an amount of the phase shifted by the phase shifter 50), the output from the phase shifted local signal multiplier 54 is represented as:

$$((I(t)+P(t))\cos \omega t + Q(t)\sin \omega t)\cos(\omega t+\phi) \quad (33)$$

The subtraction subject signal selecting section 61 selects the I signal or the Q signal, and supplies the selected signal to the amplifier 62. If the pseudo noise is added to the I signal, the I signal is supplied to the amplifier 62. The I signal is amplified by the amplifier 62, and is supplied to the adder 64. The DC offset (DC-R) is added to the I signal amplified by the amplifier 62 to adjust the offset error of the I signal. The output from the adder 64 is amplified by the variable gain amplifier 68. As a result, the amplitude error of the I signal is adjusted.

The output from the phase shifted local signal multiplier 54 and an output from the variable gain amplifier 68 are supplied to the first subtractor 60. The first subtractor 60 subtracts the output from the variable gain amplifier 68 from the output from the phase shifted local signal multiplier 54. Equation (34) represents the output from the phase shifted local signal multiplier 54. Note that φ=0.

$$((I(t)+P(t))\cos \omega t + Q(t)\sin \omega t)\cos \omega t \quad (34)$$

The output from the variable gain amplifier 68 is represents as I(t).

The output from the first subtractor 60 is represented as:

$$((I(t)+P(t))\cos \omega t + Q(t)\sin \omega t)\cos \omega t - I(t) = (-1+ \cos^2 \omega t) I(t) + P(t)\cos^2 \omega t + (\frac{1}{2})Q(t)\sin 2\omega t \quad (35)$$

If it is configured such that $\cos^2 \omega t=1$, a term of I(t) becomes almost negligible. Consequently, the dynamic range of the pseudo noise multiplier 56 may be lower than that of the first embodiment. If the term of I(t) is not negligible (first embodiment), the dynamic range of the pseudo noise multiplier 56 must be high.

The pseudo noise multiplier 56 multiplies the output from the first subtractor 60 by the pseudo noise PN. A subsequent operation is the same as that of the first embodiment.

The second embodiment provides a similar effect as the first embodiment. Moreover, the dynamic range of the pseudo noise multiplier 56 may be low.

Third Embodiment

A third embodiment is different from the first embodiment in that a signal obtained by subtracting the signal obtained by mixing the I signal or the Q signal with the local signal from the output from the IF signal output adder 52 is multiplied by the output from the phase shifter 50 by the phase shifted local signal multiplier 54.

Figure 5:
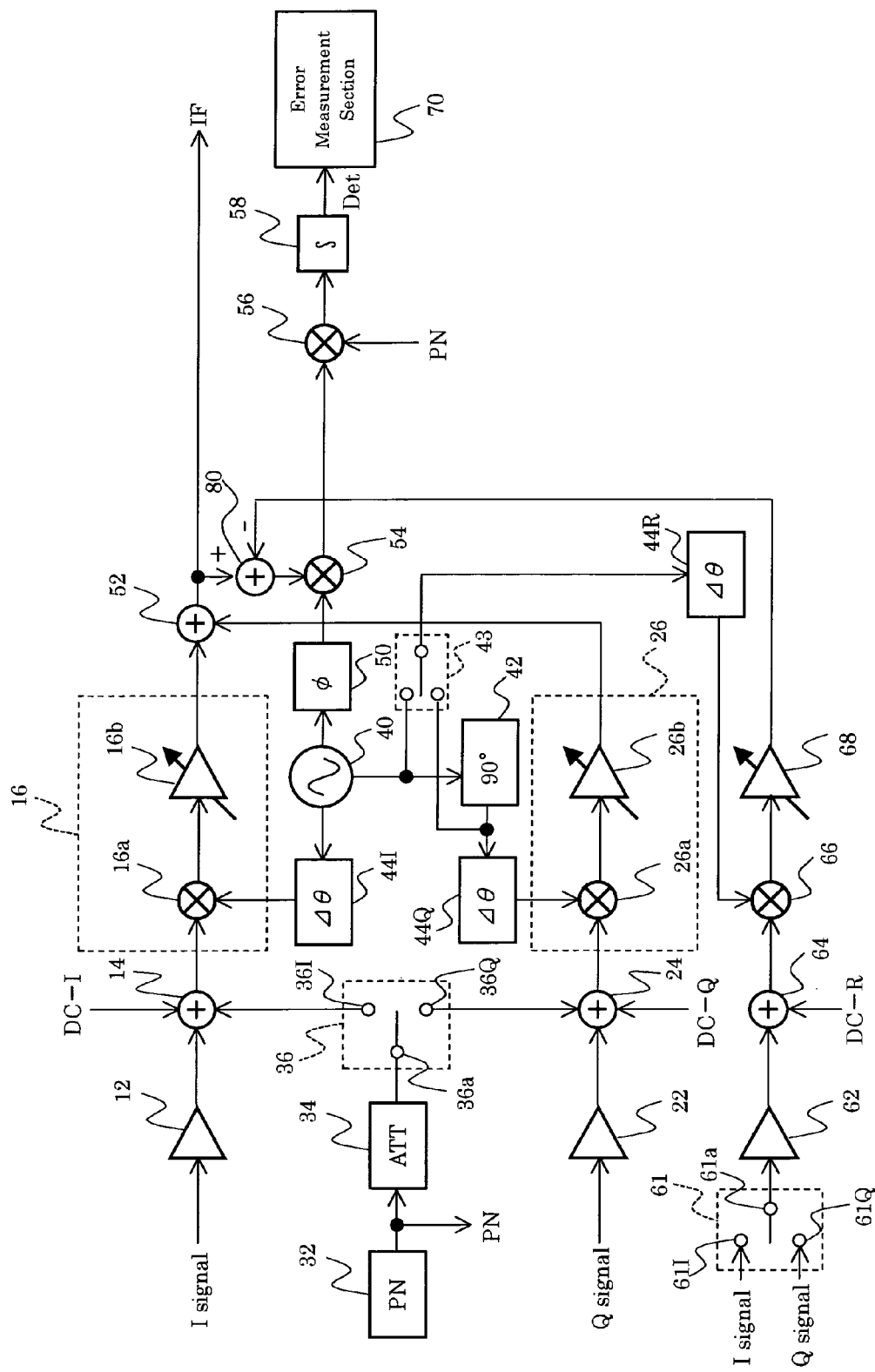
FIG. 5 is a block diagram showing a configuration of an orthogonal modulation device according to a third embodiment of the present invention.
Figure 6:
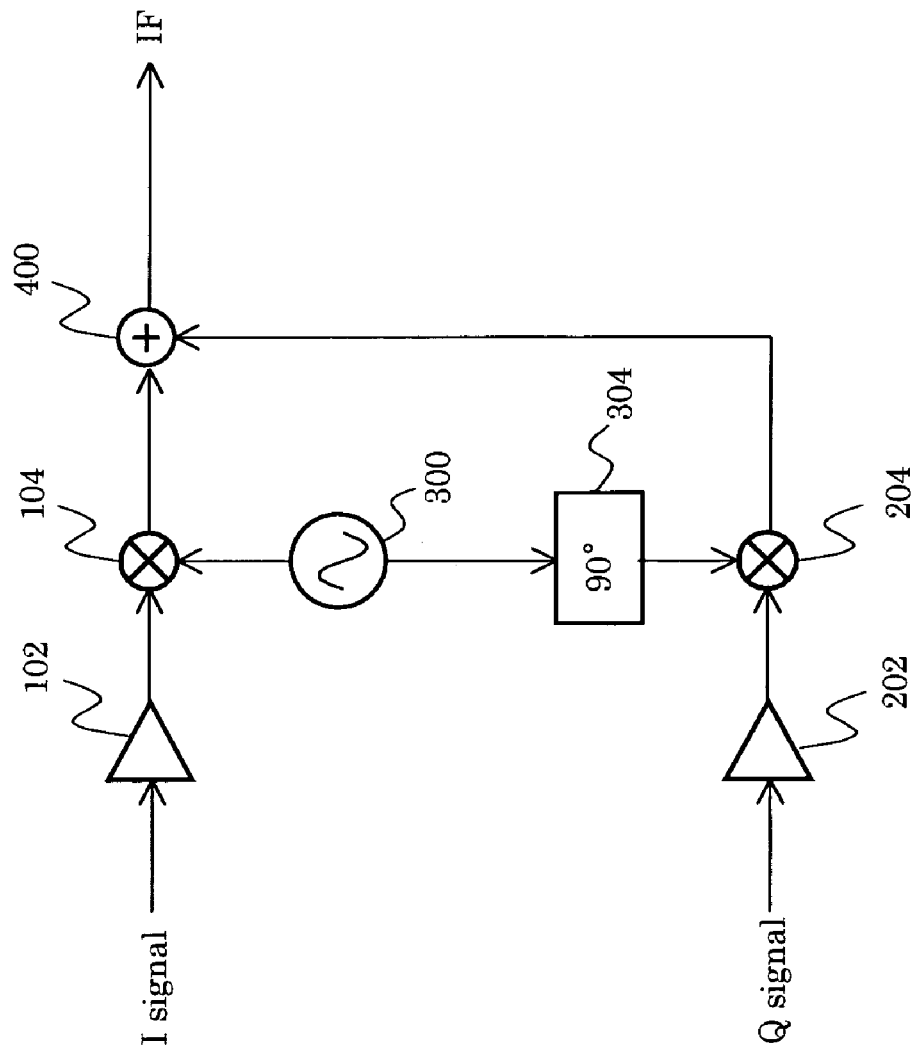
FIG. 6 is a block diagram showing a configuration of an orthogonal modulation circuit according to prior art.

FIG. 5 is a block diagram showing a configuration of an orthogonal modulation device according to a third embodiment of the present invention. The orthogonal modulation device according to the third embodiment is provided with the amplifiers 12 and 22, the adders 14 and 24, the signal conversion sections 16 and 26, the pseudo noise generator 32, the attenuator 34, the pseudo noise addition subject signal selecting section 36, the local signal source 40, the 90-degree phase shifter 42, a switch 43, phase finely adjusting sections 44I, 44Q, and 44R, the phase shifter 50, the IF signal output adder 52, the phase shifted local signal multiplier 54, the pseudo noise multiplier 56, the integrator 58, the subtraction subject signal selecting section 61, the amplifier 62, the adder 64, a multiplier 66, the variable gain amplifier 68, the error measurement section 70, and a second subtractor 80. In the following section, similar components are denoted by the same numerals as of the first and second embodiments, and will be explained in no more details.

The amplifiers 12 and 22, the adders 14 and 24, the signal conversion sections 16 and 26, the pseudo noise generator 32, the attenuator 34, the pseudo noise addition subject signal selecting section 36, the local signal source 40, the 90-degree phase shifter 42, the phase finely adjusting sections 44I and 44Q, the phase shifter 50, the IF signal output adder 52, the phase shifted local signal multiplier 54, the pseudo noise multiplier 56, the integrator 58, and the error measurement section 70 are the same as those in the first embodiment. Note that the phase shifted local signal multiplier 54 multiplies the output from the phase shifter 50 by an output from the second subtractor 80.

The subtraction subject signal selecting section 61, the amplifier 62, and the adder 64 are the same as those in the second embodiment.

The switch 43 supplies the phase finely adjusting section 44R with the local signal generated by the local signal source 40 (upon the subtraction subject signal selecting section 61 selecting the I signal), or the output from the 90-degree phase shifter 42 (upon the subtraction subject signal selecting section 61 selecting the Q signal).

The phase finely adjusting section 44R carries out such adjustment that the phase of an output therefrom matches that of the I signal or the Q signal. Namely, the phase finely adjusting section 44R adjusts the phase error.

The multiplier 66 multiplies the output from the phase finely adjusting section 44R and the output from the adder 64, and outputs a multiplied result. As a result, the I signal or the Q signal is mixed with the local signal.

The variable gain amplifier 68 amplifies the output from the multiplier 66, and outputs the amplified signal. The variable gain amplifier 68 adjusts the amplitude error of the I signal or the Q signal by changing the gain. The variable gain amplifier 68 may be provided prior to the multiplier 66.

The second subtractor 80 subtracts the output from the variable gain amplifier 68 from the output from the IF signal output adder 52.

A description will now be given of an operation of the third embodiment.

The pseudo noise generator 32 generates the pseudo noise PN. The level of the pseudo noise PN is reduced to the level equal to or lower than the floor noise by the attenuator 34. The pseudo noise PN is input to the adder 14 or the adder 24 by the pseudo noise addition subject signal selecting section 36.

The I signal (Q signal) is amplified by the amplifier 12 (22), and is supplied to the adder 14 (24). The pseudo noise PN is supplied to the adder 14 (or the adder 24).

If the pseudo noise PN is supplied to the adder 14, the pseudo noise PN is added to the I signal amplified by the amplifier 12, resulting in the pseudo noise superimposed signal. The DC offset (DC-I) is further added by the adder 14 to adjust the offset error of the I signal. The DC offset (DC-Q) is added to the Q signal amplified by the amplifier 22 to adjust the offset error of the Q signal.

If the pseudo noise PN is supplied to the adder 24, the pseudo noise PN is added to the Q signal amplified by the amplifier 22, resulting in the pseudo noise superimposed signal. The DC offset (DC-Q) is further added by the adder 24 to adjust the offset error of the Q signal. The DC offset (DC-I) is added to the I signal amplified by the amplifier 12 to adjust the offset error of the I signal.

The local signal source 40 generates the local signal at the predetermined local frequency. The local signal is supplied to the signal conversion section 16 via the phase finely adjusting section 44I. Moreover, the local signal is supplied to the signal conversion section 26 via the 90-degree phase shifter 42 and the phase finely adjusting section 44Q.

If the pseudo noise PN is supplied to the adder 14, the multiplier 16a mixes the pseudo noise superimposed signal output from the adder 14 with the local signal. If the I signal, the pseudo noise PN, and the local signal are respectively denoted by I(t), P(t), and cos ωt, the output from the multiplier 16a is represented as:

$$(I(t)+P(t))\cos \omega t \qquad (41)$$

The output from the multiplier 16a is amplified by the variable gain amplifier 16b. As a result, the amplitude error of the I signal is adjusted.

The multiplier 26a mixes the signal output from the adder 24 with the local signal (note that the phase is shifted by 90°). If the Q signal and the local signal are respectively denoted by Q(t) and cos ωt, the output from the multiplier 26a is represented as:

$$Q(t)\sin \omega t \qquad (42)$$

The output from the multiplier 26a is amplified by the variable gain amplifier 26b. As a result, the amplitude error of the Q signal is adjusted.

The outputs from the signal conversion section 16 and the signal conversion section 26 are added by the IF signal output adder 52 to generate the IF signal. Consequently, the IF signal is obtained and is modulated. Since the level of the pseudo noise PN is low, there is caused no problem if the IF signal is used as a modulated signal.

The subtraction subject signal selecting section 61 selects the I signal or the Q signal, and supplies the selected signal to the amplifier 62. If the pseudo noise is added to the I signal, the I signal is supplied to the amplifier 62. The I signal is amplified by the amplifier 62, and is supplied to the adder 64. The DC offset (DC-R) is added to the I signal amplified by the amplifier 62 to adjust the offset error of the I signal. An output from the adder 64 is supplied to the multiplier 66. The multiplier 66 mixes the I signal with the local signal. The mixed signal is then amplified by the variable gain amplifier 68. As a result, the amplitude error of the I signal is adjusted. The output from the variable gain amplifier 68 is represented as I(t)cos ωt. Since the local signal is mixed, which is different from the second embodiment, the output is not represented as I(t).

The second subtractor 80 subtracts the output from the variable gain amplifier 68 from the output from the IF signal output adder 52. The output from the second subtractor 80 is represented as:

$$(I(t)+P(t))\cos \omega t+Q(t)\sin \omega t-I(t)\cos \omega t= \\ P(t)\cos \omega t+Q(t)\sin \omega t \qquad (43)$$

It should be noted that terms of I(t) are no longer present.

The output from the second subtractor 80 and the output from the phase shifter 50 are multiplied by the phase shifted local signal multiplier 54. If the output from the phase shifter 50 is represented as cos(ωt+φ) (note that φ=an amount of the phase shifted by the phase shifter 50), the output from the phase shifted local signal multiplier 54 is represented as:

$$(P(t)\cos \omega t+Q(t)\sin \omega t)\cos(\omega t+\phi) \qquad (44)$$

The pseudo noise multiplier 56 multiplies the output from the phase shifted local signal multiplier 54 by the pseudo noise PN, and the integrator 58 integrates the resulting signal. Note that the integration interval is sufficiently longer than the period of the pseudo noise PN and the period of the local signal. Note that the period of the pseudo noise PN is sufficiently longer than the period of the local signal. If the φ=0, the output from the integrator 58 is represented as:

$$\int P(t)(P(t)\cos\omega t + Q(t)\sin\omega t)\cos\omega t = \qquad (45)$$
$$\int P(t)^2\cos^2\omega t + (1/2)\int P(t)Q(t)\sin2\omega t = c$$

Note that ∫ sin ωt·cos ωt=(½)·∫ sin 2ωt=0, and a term of Q(t) is thus no longer present. Terms of I(t) are not present either. Consequently, the dynamic range of the pseudo noise multiplier 56 may be lower than that of the first embodiment. If the term of I(t) is not negligible (first embodiment), the dynamic range of the pseudo noise multiplier 56 must be high.

A subsequent operation is the same as that of the first embodiment.

The third embodiment provides a similar effect as the first embodiment. Moreover, the dynamic range of the pseudo noise multiplier 56 may be low.

Note that, on a computer including a CPU, a hard disk, and a media (such as a floppy disk and a CD-ROM) reading device, the media reading device may be caused to read a medium recording a program realizing the respective components described above (such as the error measurement section 70), and the program may be installed on the hard disk in above embodiments. The orthogonal modulation device may be realized in this way.

The invention claimed is:

1. An orthogonal modulation device comprising:
   an adding means that outputs a pseudo noise superimposed signal obtained by adding a pseudo noise to a user signal;
   a signal conversion means that mixes the pseudo noise superimposed signal with a local signal at a predetermined local frequency, and outputs a converted signal;
   a phase shifting means that outputs a phase shifted local signal obtained by shifting the phase of the local signal;
   a phase shifted local signal multiplying means that multiplies the converted signal by the phase shifted local signal; and
   a correlating means that obtains a correlation between an output from said phase shifted local signal multiplying means and the pseudo noise.

2. The orthogonal modulation device according to claim 1, wherein said correlating means comprises:
   a pseudo noise multiplying means that multiplies the output from said phase shifted local signal multiplying means by the pseudo noise; and
   an integrating means that integrates an output from said pseudo noise multiplying means, and outputs an integrated signal.

3. The orthogonal modulation device according to claim 2, wherein an integration interval of said integrating means is sufficiently longer than the period of the local signal.

4. The orthogonal modulation device according to claim 2, wherein
   the integration interval of said integrating means is sufficiently longer than the period of the pseudo noise; and
   the period of the pseudo noise is sufficiently longer than the period of the local signal.

5. The orthogonal modulation device according to claim 2, comprising:
   an error measurement means that measures a DC offset error, a phase error, and an amplitude error in the output from said integrating means.

6. The orthogonal modulation device according to claim 5, wherein said error measurement means neglects at least one of the DC offset error, the phase error, and the amplitude error, and measures errors which are not neglected.

7. The orthogonal modulation device according to claim 1, wherein the pseudo noise is smaller than the user signal.

8. The orthogonal modulation device according to claim 7, wherein the pseudo noise is approximately equal to a floor noise.

9. The orthogonal modulation device according to claim 1 wherein the user signal includes an I signal and a Q signal, comprising:
   a pseudo noise addition subject signal selecting means that selects whether the pseudo noise is added to the I signal or the Q signal.

10. The orthogonal modulation device according to claim 1, comprising:
    a first subtracting means that subtracts the user signal from the output from said phase shifted local signal multiplying means, said pseudo noise multiplying means multiplying an output from said first subtracting means by the pseudo noise.

11. The orthogonal modulation device according to claim 10 wherein the user signal includes an I signal and a Q signal, comprising:
    a pseudo noise addition subject signal selecting means that selects whether the pseudo noise is added to the I signal or the Q signal; and
    a subtraction subject signal selecting means that selects the user signal to which the pseudo noise addition subject signal selecting means has selected to add the pseudo noise as the user signal to be supplied to said first subtracting means.

12. The orthogonal modulation device according to claim 1, comprising:
    a second subtracting means that subtracts a signal obtained by mixing the user signal and the local signal from the converted signal, said phase shifted local signal multiplying means multiplying a signal output from said second subtracting means by the phase shifted local signal.

13. The orthogonal modulation device according to claim 12 wherein the user signal includes an I signal and a Q signal, comprising:
    a pseudo noise addition subject signal selecting means that selects whether the pseudo noise is added to the I signal or the Q signal; and
    a subtraction subject signal selecting means that selects the user signal to which the pseudo noise addition subject signal selecting means has selected to add the pseudo noise as the user signal to be supplied to said second subtraction means.

14. An orthogonal modulation method comprising:
    an adding step of outputting a pseudo noise superimposed signal obtained by adding a pseudo noise to a user signal;
    a signal conversion step of mixing the pseudo noise superimposed signal with a local signal at a predetermined local frequency, and outputs a converted signal;
    a phase shifting step of outputting a phase shifted local signal obtained by shifting the phase of the local signal;
    a phase shifted local signal multiplying step of multiplying the converted signal by the phase shifted local signal;
    a correlating step of obtaining a correlation between an output from said phase shifted local signal multiplying step and the pseudo noise; and
    an error measurement step of measuring an error of said user signal based on an output from said correlating step.

15. A program of instructions for execution by a computer to perform an error measurement process of an orthogonal modulation device having: an adding means that outputs a pseudo noise superimposed signal obtained by adding a pseudo noise to a user signal; a signal conversion means that mixes the pseudo noise superimposed signal with a local signal at a predetermined local frequency, and outputs a converted signal; a phase shifting means that outputs a phase shifted local signal obtained by shifting the phase of the local signal; a phase shifted local signal multiplying means that multiplies the converted signal by the phase shifted local signal; and a correlating means that obtains a correlation between an output from said phase shifted local signal multiplying means and the pseudo noise, said error measurement process comprising:
    an error measurement step of measuring an error of said user signal based on an output from said correlating means.

16. A computer-readable medium having a program of instructions for execution by a computer to perform an error measurement process of an orthogonal modulation device having: an adding means that outputs a pseudo noise superimposed signal obtained by adding a pseudo noise to a user signal; a signal conversion means that mixes the pseudo noise superimposed signal with a local signal at a predetermined local frequency, and outputs a converted signal; a phase shifting means that outputs a phase shifted local signal obtained by shifting the phase of the local signal; a phase shifted local signal multiplying means that multiplies the converted signal by the phase shifted local signal; and a correlating means that obtains a correlation between an output from said phase shifted local signal multiplying means and the pseudo noise, said error measurement process comprising:
  an error measurement step of measuring an error of said user signal based on an output from said correlating means.

17. A modulation device comprising:
an adding means that outputs a pseudo noise superimposed signal obtained by adding a pseudo noise to a user signal; and
a correlating means that obtains a correlation between a modulated signal obtained by modulating an output from said adding means and the pseudo noise.

18. An orthogonal modulation device comprising:
an adder that outputs a pseudo noise superimposed signal obtained by adding a pseudo noise to a user signal;
a signal converter that mixes the pseudo noise superimposed signal with a local signal at a predetermined local frequency, and outputs a converted signal;
a phase shifter that outputs a phase shifted local signal obtained by shifting the phase of the local signal;
a phase shifted local signal multiplier that multiplies the converted signal by the phase shifted local signal; and
a correlator that obtains a correlation between an output from the phase shifted local signal multiplier and the pseudo noise.

19. The orthogonal modulation device according to claim 18, wherein the correlator comprises:
a pseudo noise multiplier that multiplies the output from the phase shifted local signal multiplier by the pseudo noise; and
an integrator that integrates an output from the pseudo noise multiplier, and outputs an integrated signal.

20. The orthogonal modulation device according to claim 19, wherein an integration interval of the integrator is sufficiently longer than the period of the local signal.

21. The orthogonal modulation device according to claim 19, wherein
the integration interval of the integrator is sufficiently longer than the period of the pseudo noise; and
the period of the pseudo noise is sufficiently longer than the period of the local signal.

22. The orthogonal modulation device according to claim 19, comprising:
an error measurement section that measures a DC offset error, a phase error, and an amplitude error in the output from the integrator.

23. The orthogonal modulation device according to claim 22, wherein the error measurement section neglects at least one of the DC offset error, the phase error, and the amplitude error, and measures errors which are not neglected.

24. The orthogonal modulation device according to claim 18, wherein the pseudo noise is smaller than the user signal.

25. The orthogonal modulation device according to claim 24, wherein the pseudo noise is approximately equal to a floor noise.

26. The orthogonal modulation device according to claim 18, wherein the user signal includes an I signal and a Q signal, comprising:
a pseudo noise addition subject signal selector that selects whether the pseudo noise is added to the I signal or the Q signal.

27. The orthogonal modulation device according to claim 18, comprising:
a first subtractor that subtracts the user signal from the output from the phase shifted local signal multiplier, the pseudo noise multiplier multiplying an output from the first subtractor by the pseudo noise.

28. The orthogonal modulation device according to claim 27 wherein the user signal includes an I signal and a Q signal, comprising:
a pseudo noise addition subject signal selector that selects whether the pseudo noise is added to the I signal or the Q signal; and
a subtraction subject signal selector that selects the user signal to which the pseudo noise addition subject signal selector has selected to add the pseudo noise as the user signal to be supplied to the first subtractor.

29. The orthogonal modulation device according to claim 18, comprising:
a second subtractor that subtracts a signal obtained by mixing the user signal and the local signal from the converted signal, the phase shifted local signal multiplier multiplying a signal output from the second subtractor by the phase shifted local signal.

30. The orthogonal modulation device according to claim 29 wherein the user signal includes an I signal and a Q signal, comprising:
a pseudo noise addition subject signal selector that selects whether the pseudo noise is added to the I signal or the Q signal; and
a subtraction subject signal selector that selects the user signal to which the pseudo noise addition subject signal selecting means has selected to add the pseudo noise as the user signal to be supplied to the second subtractor.

31. A program of instructions for execution by a computer to perform an error measurement process of an orthogonal modulation device having: an adder that outputs a pseudo noise superimposed signal obtained by adding a pseudo noise to a user signal; a signal converter that mixes the pseudo noise superimposed signal with a local signal at a predetermined local frequency, and outputs a converted signal; a phase shifter that outputs a phase shifted local signal obtained by shifting the phase of the local signal; a phase shifted local signal multiplier that multiplies the converted signal by the phase shifted local signal; and a correlator that obtains a correlation between an output from the phase shifted local signal multiplier and the pseudo noise, the error measurement process comprising:
measuring an error of the user signal based on an output from the correlator.

32. A computer-readable medium having a program of instructions for execution by a computer to perform an error measurement process of an orthogonal modulation device having: an adder that outputs a pseudo noise superimposed signal obtained by adding a pseudo noise to a user signal; a signal converter that mixes the pseudo noise superimposed signal with a local signal at a predetermined local frequency, and outputs a converted signal; a phase shifter that outputs a phase shifted local signal obtained by shifting the phase of the local signal; a phase shifted local signal multiplier that multiplies the converted signal by the phase shifted local signal; and a correlator that obtains a correlation between an output from the phase shifted local signal multiplier and the pseudo noise, the error measurement process comprising:
measuring an error of the user signal based on an output from correlator.

33. A modulation device comprising:
an adder that outputs a pseudo noise superimposed signal obtained by adding a pseudo noise to a user signal; and
a correlator that obtains a correlation between a modulated signal obtained by modulating an output from the adder and the pseudo noise.

* * * * *